Patented Apr. 2, 1935

1,996,262

UNITED STATES PATENT OFFICE 1,996,262

PURIFICATION OF NAPHTHALENE

James D. Todd and Jay C. Owens, Chicago, Ill., assignors to The Sherwin-Williams Company, Cleveland, Ohio, a corporation of Ohio No Drawing. Application December 17, 1931, Serial No. 581,773

8 Claims. (Cl. 260—168)

The present invention relates to the purification of naphthalene particularly by distillation methods.

Naphthalene may be distilled by ordinary application of heat to boil or vaporize the naphthalene, and also by introduction of gas or vapor, as by steam distillation. Heretofore, crude naphthalene has been so distilled at a pH of 7 or over, or from a neutral or alkaline condition, or in other words, in a non-acid state. The distilled product has been then subjected to acid washes, then to reagents for neutralizing the acid, and then again to distillation.

The present invention aims to simplify the purification of naphthalene by distilling it from an acid condition.

A particular object of the invention is simplification of the present methods for purification of crude naphthalene.

Another object of the invention is the use of an acidifying agent in a naphthalene being distilled.

Still another object of the invention is the distillation of naphthalene in the presence of an acid dissolved therein.

Various other and ancillary objects and advantages of the invention will become apparent from the following description and explanation of the invention, which are given in connection with several detailed examples of the invention, as it may be used commercially.

It is not necessary in explaining this invention to refer specifically to the nature of impurities found in crude, or partially refined naphthalene. These may vary in character and amount, according to the previous history of the naphthalene or the material from which the naphthalene is derived. However, it appears that in the distillation of crude naphthalene there passes over with the naphthalene, substance which is effectively removed by an acid wash or converted into a non-distillable, or a less easily distillable substance by acid, when acid is employed and then neutralized. Ammonia base materials, such as pyridin, are among the numerous impurities commonly found. These in particular are capable of combining with acid to form complexes which do not so readily volatilize. The present invention is based upon the discovery that distillation in the presence of acid materially improves the distillate over that which is obtained from a neutral or from alkaline naphthalene, and that if acid is used before distillation and/or during distillation, it is not necessary to wash with acid after distillation.

In practicing the invention it is not necessary, nor perhaps desirable, to dispense entirely with acid washing. This may be done, as it has been done heretofore, to remove such substances as may be conveniently altered by acid and easily removed from the naphthalene by washing, as with water. Crude or impure naphthalene may also contain volatile substances, such as phenols and cresols, which are not rendered non-volatile by acids. These substances are soluble in alkaline solutions, and hence are easily removed by an alkali wash. Accordingly, the naphthalene employed for this invention may be or may not be washed with alkali, such as caustic soda, before the acid distillation.

The distillation may be effected in the presence of strong or weak acids, such as sulphuric or phosphoric acid, or various acid salts which are acid in fact. The specific character of the acid radical appears not to be important, so long as it is stable, or otherwise forms a reaction product which is acid in character. This requirement excludes weakly acid oxidizing substances such as potassium dichromate. However, it is preferred that it should not be one which is distillable in the presence of naphthalene under the conditions of distillation, such as hydrochloric acid. The latter is not excluded from the invention for the reason that it is not a preferred acid. It may be used, and although a part of it may be distilled over into the distillate, it does nevertheless function to cause other materials to remain as a still residue. The acid which may distill over may be removed by a water wash, or may be entirely unobjectionable in some uses of the distillate. Where steam distillation is used for such a volatile acid the condensate will comprise an acid water which easily permits removal of the excess acid. Other volatile acids may be used, such as acetic acid. A permanent hydrogen ion concentration below pH$^7$, as produced by suitable acids or acid salts, is the essential cause of the success of any such acidic material. Specific acids or acid salts are preferred because of the certain advantages obtained.

The invention may be carried out in numerous ways for refining crude naphthalene or for increasing the purity of any impure naphthalene. It is not at all necessary in each instance to perform all the steps disclosed in the examples hereinafter given as will appear from the scope of the invention as expressed in the appended claims.

*Example I*

Commercial crude naphthalene, usually melting from 76° C. to 78° C., may be heated above its melting point and preferably below the boiling point of water which may be later contained therein. For example, a temperature of 85° to 90° C. for the melted naphthalene is satisfactory. To 100 parts by weight of such naphthalene 3 parts by weight of concentrated sulphuric acid may be added, such for example as from 93% to 98% acid. It is to be understood that under these conditions such a strong acid may in part react with naphthalene, and produce one or more sulphonic acids and water. However, this is not an obstacle because (1) sulphonation cannot proceed too far, forming water which stops the reactions, and (2) the sulphonic acids themselves are strong acids, and each is suitable per se as an acid for this invention. A mono sulphonic acid of naphthalene has been employed alone as an effective acid substance during distillation, using very little water in the mass.

When the acid is added to the naphthalene the mixture may be agitated, and the agitation may be continued for a short time, such as 15 minutes. A longer time is not necessary but is not harmful. The time should be judged in accordance with the character of agitation, in order to assure complete contact of all the naphthalene with the acid. Then the mixture is allowed to settle forming two layers. The lower layer of acid or sludge may be drained off carrying with it a considerable quantity of the impurities. Some acid may remain as a residuum in solution in the naphthalene, or even in mechanical suspension. A small quantity, for example 1 part of very hot or boiling water may be added to wash the mass, agitation being used if desired. The layer of wash water is then drained off. This merely aids in further removal of impurities and of the acid or the sludge layer. Thereafter water and more acid material is added for imparting to the mass an acid character for steam distillation. For example, 10 parts of water and 10 parts by weight of the same concentrated sulphuric acid may be added. Distillation may be effected in any usual way, for example, and preferably, by injection of live steam, supplemented by heat transfer from a steam coil. The distillate may be drained from water of condensation leaving a refined naphthalene. The dried naphthalene may have a melting point of 79.9° C.

Where much water is present in the naphthalene steam distillation is preferred. Where steam distillation is used, however, it is immaterial whether water is present in the naphthalene. Nevertheless, where direct distillation is practiced, it is desirable that the amount of water in the naphthalene be minimized.

*Example II*

The process duplicates Example I through the steps of draining off the first added acid. Then the acid treatment is repeated with a second addition of 3 parts of the same concentrated sulphuric acid. This is likewise drained off as a sludge. Then the same washing with hot or boiling water is employed, and the wash water is drained off. The naphtalene, substantially free from the added water, but not necessarily entirely free, is distilled in the presence of 5 parts of sodium or potassium acid sulphate to 100 parts of original naphthalene base, using direct heat at atmospheric pressure.

The absence of large amounts of water, and the use of acid salt, is effective to keep both water and entrained acid, out of the distillate.

*Example III*

The process of Example II may be repeated using in the distillation step the same proportion of phosphoric acid as a substitute for the sulphuric acid salt. Vacuum distillation also may be practiced.

*Example IV*

Heat 100 parts of naphthalene to 85° to 90° C. While agitating, add 3 parts of sulphuric acid (93% to 98%). Continue agitation for 15 minutes. Allow to settle, and drain off acid sludge. Repeat the acid washing with a second addition of 3 parts of said sulphuric acid. Again drain off the sludge. Distill the residual naphthalene using direct heat at atmospheric pressure.

Sufficient acid here remains in the naphthalene to impart acidity to the batch during distillation. Sulphonic acids readily dissolve in napthalene and so dissolved function in the whole mass as the same is operated upon in this example.

Of the various mineral acids employed, it has been found that sulphuric acid is the best. This is no doubt due to the ease with which it forms sulphonic acids. A sulphonic acid of naphthalene is an example of an acid substance which is soluble in the naphthalene. Such an acid so dissolved more readily performs its acid functions on the impurities because of the better contact between acid and impurities, both being solutes in the naphthalene.

From the foregoing examples it will be readily apparent to those skilled in the art that numerous changes in operative manipulation and in materials may be employed without departing from the spirit and scope of the invention as expressed in the appended claims.

We claim:

1. The process of refining naphthalene which comprises distilling naphthalene from a mixture of impure naphthalene and an acid sulphate salt.

2. The process of refining naphthalene which comprises washing impure melted naphthalene with acid, removing excess acid leaving an acidifying residuum, adding water, and distilling naphthalene from the acidified washed naphthalene, the acid concentration at distilling temperature being insufficient to act chemically on the naphthalene.

3. The process of refining naphthalene which comprises washing melted impure naphthalene with a small quantity of concentrated sulphuric acid, removing the separable layer containing said acid, washing the residual melted naphthalene with water, removing the separable layer containing the water, adding to the residual naphthalene an acidic substance, and distilling naphthalene from the acidified mixture, the acid during distillation being incapable of chemically acting upon naphthalene.

4. The method of purifying naphthalene which comprises adding not over about 5% of an acid substance to naphthalene and distilling naphthalene from the acid mass, said acid substance being capable under the conditions employed of remaining at least in substantial part unchanged by chemical union with naphthalene both preceding and during the distillation.

5. The method of purifying a batch of impure naphthalene which comprises adding to the naphthalene a small quantity of an acid substance and water sufficient to form an acid condition in the batch and distilling substantially all of said naphthalene from the acidified batch, the concentration and quantity of acid therein at the temperature of distillation being such as to prevent loss of any substantial amount of naphthalene by chemical union of acid and naphthalene, and the quantity further being such as to render the still mass permanently acid during the distillation.

6. The method of purifying a batch of impure naphthalene which comprises adding to the naphthalene a small quantity of an acid substance and water sufficient to form an acid condition in the batch and steam distilling substantially all of said naphthalene from the acidified batch, the concentration and quantity of acid therein at the temperature of distillation being such as to prevent loss of any substantial amount of naphthalene by chemical union of acid and naphthalene, and the quantity further being such as to render the still mass permanently acid during the distillation.

7. The method of purifying a batch of impure naphthalene which comprises adding to the naphthalene a small quantity of an acid substance containing the sulphate ion and water sufficient to form an acid condition in the batch, and distilling substantially all of said naphthalene from the acidified batch, the concentration and quantity of acid therein at the temperature of distillation being such as to prevent loss of any substantial amount of naphthalene by chemical union of acid and naphthalene, and the quantity further being such as to render the still mass permanently acid during the distillation.

8. The process of refining naphthalene, which comprises washing impure naphthalene with an aqueous alkali solution to remove alkali soluble impurities, washing the naphthalene thus treated with a concentrated acid to remove acid soluble impurities and washing with water to remove water soluble impurities, and distilling the naphthalene so treated in the presence of a small quantity of acid under conditions which avoid any substantial reaction with naphthalene and yet maintaining acidity throughout the distillation.

JAMES D. TODD.
JAY C. OWENS.